United States Patent
Andler

[19]

[11] Patent Number: 5,939,215
[45] Date of Patent: Aug. 17, 1999

[54] LAMINATED MATERIAL AND PROCESS FOR PRODUCING THE SAME

[75] Inventor: Gerd Andler, Frankfurt, Germany

[73] Assignee: Federal-Mogul Wiesbaden Gmbh, Wiesbaden, Germany

[21] Appl. No.: 08/836,994

[22] PCT Filed: Oct. 12, 1995

[86] PCT No.: PCT/DE95/01433

§ 371 Date: Aug. 4, 1997

§ 102(e) Date: Aug. 4, 1997

[87] PCT Pub. No.: WO96/17100

PCT Pub. Date: Jun. 6, 1996

[30] Foreign Application Priority Data

Nov. 26, 1994 [DE] Germany .......................... P 44 42 186

[51] Int. Cl.[6] .............................. B32B 15/00; B05D 1/36; B05D 1/02

[52] U.S. Cl. .......................... 428/653; 428/645; 428/646; 428/647; 428/648; 428/681; 428/937; 427/405; 427/421; 427/455; 427/456; 205/241; 205/252

[58] Field of Search .................................. 427/405, 404, 427/421, 597, 455, 456; 428/548, 555, 645, 646, 647, 648, 653, 681, 936, 937; 205/241, 252

[56] References Cited

U.S. PATENT DOCUMENTS

| | | | |
|---|---|---|---|
| 3,726,292 | 4/1973 | Heck | 29/182.3 |
| 4,189,522 | 2/1980 | Mori | 428/557 |
| 4,518,938 | 5/1985 | Bartholomaus et al. | 335/262 |
| 5,000,586 | 3/1991 | Daxer et al. | 384/283 |
| 5,087,529 | 2/1992 | Engel et al. | 428/552 |
| 5,116,692 | 5/1992 | Mori et al. | 428/650 |
| 5,185,216 | 2/1993 | Tanaka et al. | 428/614 |
| 5,545,489 | 8/1996 | Tanaka et al. | 428/629 |

OTHER PUBLICATIONS

Ushijima et al., "Treatment of Surface of Concrete", Patent Abstracts of Japan, Oct. 25, 1991.

*Primary Examiner*—Michael Lusignan
*Assistant Examiner*—Michael Barr
*Attorney, Agent, or Firm*—Jon E. Shackelford

[57] ABSTRACT

A metallic backing layer such as steel covered by a functional layer of AlSn, AlPb, CuPb, CuSn or CuZn, applied by spraying in air, and a softer covering layer applied to the functional layer by chemical or electrolytic deposition exhibits improved corrosion resistance, running-in behavior and conformability.

13 Claims, 1 Drawing Sheet

LAMINATED MATERIAL AND PROCESS FOR PRODUCING THE SAME

BACKGROUND OF THE INVENTION

1. Field of the Invention invention relates to a multilayer material, especially for sliding elements in lubricated tribological systems, comprising a metallic backing layer, especially of steel, and a functional layer, especially of AlSn, AlPb, CuPb, CuSn or CuZn. The invention also relates to a process for producing such multilayer materials.

2. Description of Related Art

Multilayer materials suitable for making into plain bearing elements, for example, and produced by vacuum plasma spraying are known from DE-OS 37 21 008. Such layers are distinguished, inter alia, by a high degree of adhesion to the base material and very low pore contents. By carrying out the process under reactive conditions, i.e. by maintaining a previously established oxygen partial pressure in the plasma, the oxide content, i.e. the content of $Al_2O_3$ particles, may be adjusted during vacuum plasma spraying. The total amount of $Al_2O_3$ particles could accordingly be limited to ca. 1 vol. % of the functional layer. The disadvantages of this process lie, however, in the considerable complexity of the process, which makes the production of mass produced parts cost-intensive.

If the plain bearing layers are produced by air plasma spraying, as described in EP 0 364 547, the resultant layers have a high oxide content caused by the process. Although these oxides have a positive affect on the wear behaviour of the layers owing to their considerable hardness, they reduce their conformability to the counter-member and also impair running-in behaviour. Moreover, these layers exhibit an increased susceptibility to corrosion and erosion in a lubricated system. Thus, for example, the penetration of oil under elevated pressure into the pores always present in air plasma-sprayed layers may result in erosive damage to the layer through the dissolving away of whole layer parts, wherein especially in thin layers even the backing material may under some circumstances be corrosively damaged. In particular, the pores arranged close to the surface are often the starting point for these cavitative or erosive affects. If these pores are connected together, corrosive attacks in these pore areas may also lead to defects in the layers and failure of the component.

In order to improve the corrosion-resistance of sprayed layers, it has been proposed in DE-OS 40 07 734 to effect an additional sealing process at 870–1200° C. after spraying-on of the layer. In this way, in addition to the corrosion resistance, wear resistance is also markedly increased. However, this process has to be ruled out owing to the large amount of heat which enters the base material, especially in the case of thin-walled components.

In contrast, the problem forming the basis of the invention is that of providing a multilayer material and a process for the production thereof wherein the above-mentioned multilayer material is markedly improved from the point of view of corrosion resistance, running-in behaviour and conformability.

The multilayer material according to the invention comprises a softer covering layer applied to the functional layer by chemical or electrolytic deposition.

The sprayed-on functional layer is sealed by this softer covering layer, whereby a laminar system arises which, as a result of the soft covering layer, is distinguished by good running-in behaviour and conformability. After completion of the running-in phase, the good wear properties of the sprayed-on functional layer come to bear, these being provided by the hard oxide components of this layer.

The improvement from the point of view of the running behaviour of sliding elements made of such a multilayer material consists in the fact that the machined sprayed layer is full of pores in the area close to the surface and these pores are covered and even partially filled with soft bearing materials when the softer covering layer is applied, especially by electroplating. During the running-in phase the soft electrodeposited layer, e.g. of white metal, is then largely worn away but at the same time smeared into the pores, i.e. the area close to the surface has the following appearance after the running-in phase: over a large part of the running surface the harder, sprayed bearing metal is exposed, but amongst it may be found pores filled with the softer layer, which act as soft islands in the harder matrix and ensure excellent sliding properties. A further positive effect of the covering layer applied by electroplating or chemical deposition is that the erosion and corrosion resistance of the sprayed layer is lastingly improved by sealing.

The softer layer preferably consists of PbSnCu or SnSbCu alloys. The softer covering layer preferably consists of from 80 to 95 wt. % Pb, 4 to 15 wt. % Sn and 1 to 5 wt. % Cu, a preferred composition comprising from 85 to 91 wt. % Pb, 8 to 12 wt. % Sn and 1 to 3 wt. % Cu. In the case of an SnSbCu alloy the preferred composition is composed of from 87 to 96 wt. % Sn, 3.5–10.5 wt. % Sb and 0.5 to 2.5 wt. % Cu. Another preferred composition comprises from 90.5 to 94 wt. % Sn, 5.5 to 8.5 wt. % Sb and 0.5 to 1 wt. % Cu.

Between the sprayed layer and the covering layer it is possible to apply a bonding intermediate layer of nickel, copper or nickel-tin, the thickness of which amounts preferably to from 1 to 2 $\mu$m. The pores are not filled by this intermediate layer and the pore structure is substantially preserved.

According to a preferred embodiment the sprayed-on functional layer has an oxide content of from 5–10 vol. % and a pore content of from 2–5 vol. %.

The process for producing such multilayer materials provides that a softer covering layer is applied by means of chemical or electrolytic deposition to the functional layer applied by spraying in air. Spraying methods suitable for the functional layer are air-plasma spraying, arc spraying and flame spraying.

Prior to the application of the chemically or electrolytically deposited covering layer, the sprayed bearing metal layer is preferably surface-machined by turning or grinding.

According to another embodiment it is also possible to apply between the sprayed-on bearing metal layer and the chemically or electrolytically deposited covering layer an intermediate bonding layer which may preferably comprise nickel, copper or nickel-tin. The thickness of the intermediate layer amounts preferably to 1–2 $\mu$m.

Exemplary embodiments of the invention will be described in more detail below with the aid of the drawings.

This aforementioned objects, features and advantages of the invention will, in part, be pointed out with particularity and will, in part, become obvious from the following more detailed description of a preferred embodiment of the invention, taken in conjunction with the accompanying diagrammatic drawings, which form an integral part thereof.

DETAILED DESCRIPTION OF THE PREFERRED EMBODIMENTS

Figure 1:
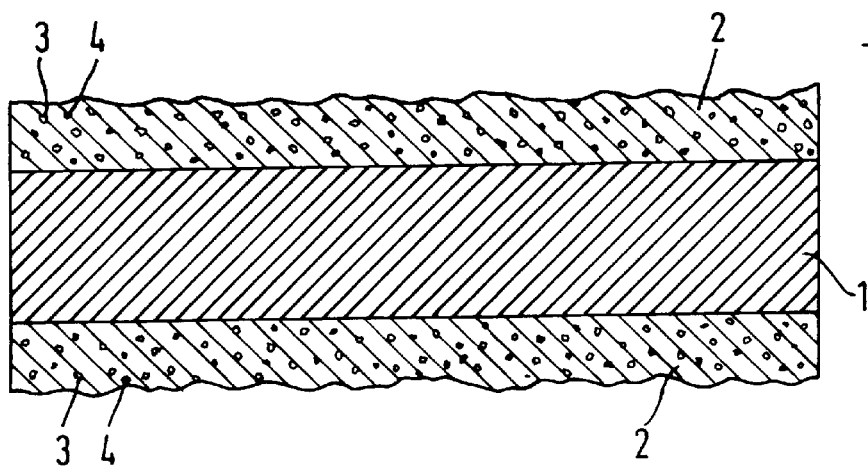
FIG. 1 is a section through an untreated multilayer material as yet without its covering layer.
Figure 2:
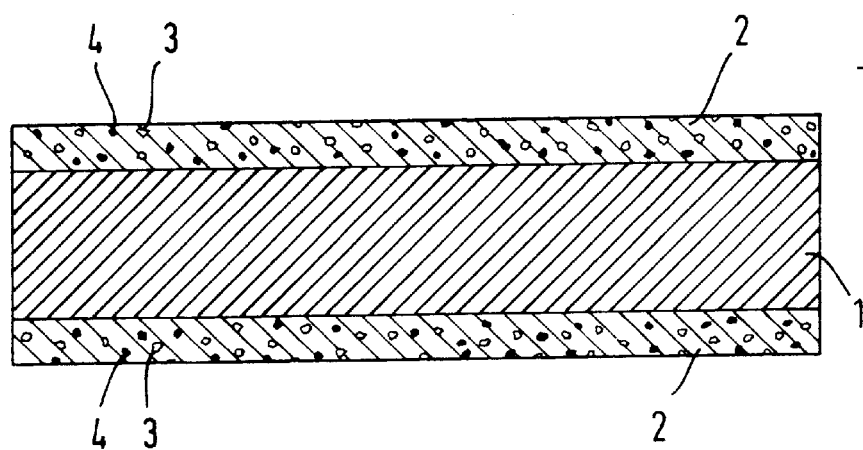
FIG. 2 shows the multilayer material shown in FIG. 1 after surface-machining.
Figure 3:
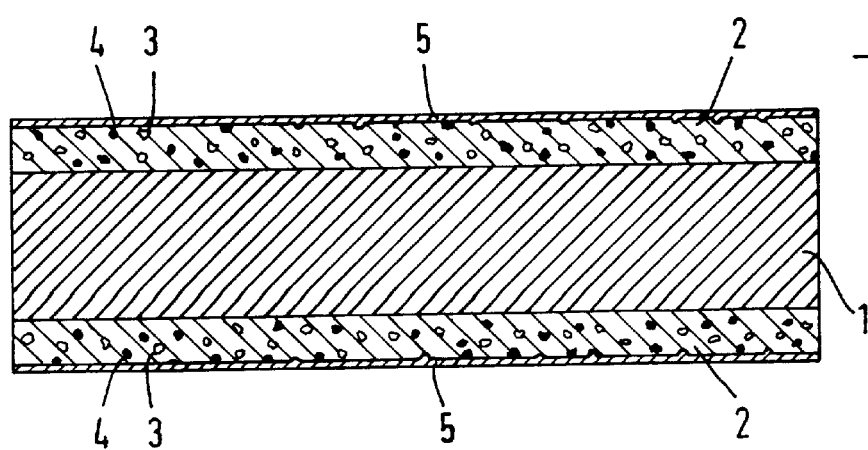
FIG. 3 shows the material according to the invention provided with a covering layer applied by electroplating.

FIG. 1 shows a multilayer material formed by the application of a bronze ($CuSn_{10}$ in a thickness of from 0.3 to 0.4 mm) to both sides of a backing material 1, for example of steel C22, by air-plasma spraying. This layer forms the sprayed layer 2, in which pores 3 and oxide particles 4 may be seen. Before the sprayed layer was sprayed on, the pretreatment methods known in plasma spraying, such as degreasing and roughening of the surface by sand-blasting, were applied. The sprayed layer 2 is then machined (see FIG. 2) by turning, to establish a layer thickness of from 200–250 $\mu$m with a roughness $R_z$, equal to from 8 to 12 $\mu$m.

Thereafter, the sprayed layer 2 is provided in a further step with the above-described covering layer 5 of PbSnCu by an electroplating method in a thickness of from 20 to 30 $\mu$m.

Obviously, numerous modifications and variations of the present invention are possible in the light of the above teachings. It is therefore to be understood that within the scope of the appended claims the invention may be practised otherwise than as specifically described herein.

What is claimed is:

1. A multilayer material, comprising a metallic backing layer; a functional metallic layer applied to the backing layer by spraying in air and comprising an alloy selected from the group consisting of AlSn, AlPb, CuPb, CuSn, and CuZn having oxide particles dispersed therein, the functional layer having a hardness; and a metallic covering layer of a material having a softer hardness than the material of functional layer and applied to the functional layer by deposition, said metallic covering layer material comprising an alloy selected from the group consisting of PbSnCu and SnSbCu, and wherein the functional layer includes surface pores that are at least partially filled by the softer covering layer material.

2. The multilayer material as claimed in claim 1, wherein the softer covering layer comprises the PbSnCu alloy having the following composition:

Pb 80–95 wt. %

Sn 4–15 wt. %

Cu 1–5 wt. %.

3. The multilayer material as claimed in claim 1, wherein the softer covering layer comprises the SnSbCu alloy having the following composition:

Sn 87–96 wt. %

Sb 3.5–10.5 wt. %

Cu 0.5–2.5 wt. %.

4. The multilayer material as claimed in claim 1, further comprising an intermediate bonding layer applied between the functional layer and the covering layer and selected from the group consisting of nickel, copper, and nickel-tin.

5. The multilayer material as claimed in claim 1, wherein the functional layer has an oxide particle content ranging from 5–10 vol. % and a pore content ranging from 2–5 vol. % of the functional layer.

6. The multilayer material as claimed in claim 1, wherein said deposition comprises electrolytic deposition.

7. The multilayer material as claimed in claim 1, wherein said deposition comprises chemical deposition in the form of electroless plating.

8. A process for producing multilayer materials comprising a metallic backing material and a porous metallic functional layer having a hardness and comprised of an alloy selected from the group consisting of AlSn, AlPb, CuPb, CuSn, and CuZn having oxide particles dispersed therein, wherein the process comprises applying the functional layer to the backing material by spraying in air to develop surface pores and the oxide particles in the functional layer, and depositing on to the sprayed functional layer a metallic covering layer having a softer hardness than the functional layer to cover and at least partially fill the surface pores and comprised of an alloy selected from the group consisting of PbSnCu and SnSbCu.

9. The process as claimed in claim 8, wherein prior to the deposition, the sprayed functional layer is surface-machined.

10. The process as claimed in claim 8, wherein prior to application of the softer covering layer, an intermediate bonding layer selected from the group consisting of nickel, copper and nickel-tin is applied to the backing layer.

11. The process as claimed in claim 10, wherein the intermediate bonding layer is applied in a thickness of from 1–2 $\mu$m.

12. A multilayer bearing comprising:

a metallic backing layer;

a functional layer of bearing metal applied to said backing layer by spraying in air to provide a matrix of said bearing metal having a dispersion of bearing metal oxides therein that are relatively harder than said matrix and a plurality of surface pores in a surface of said matrix; and a sacrificial covering layer of relatively softer metallic covering layer material applied to said functional layer and covering said surface pores such that during an initial running-in period said covering material is largely worn away and smeared into said surface pores to at least partially fill said surface pores and define islands of said soft covering layer material in said surface of said relatively harder bearing metal matrix to enhance the sliding properties of said functional layer, and wherein said bearing metal is selected from a group of bearing metal alloys consisting of AlSn. AlPb, CuPb, CuSn and CuZn having said oxides and said pores, and said covering layer material is selected from a group of covering metal alloys consisting of PbSnCu and SnSbCu.

13. A process for producing multilayer materials comprising:

preparing a metallic backing layer;

applying a functional layer of bearing metal to the backing layer by spraying in air to form a matrix of the bearing metal having a dispersion of bearing metal oxides therein that are relatively harder than the matrix and a plurality of surface pores in a surface of said matrix, the bearing metal comprising an alloy selected from the group consisting of AlSn, AlPb, CuPb, CuSn and CuZn; and depositing a sacrificial covering layer of relatively softer metallic covering layer material onto the surface of the functional layer and covering said surface pores such that during an initial running-in period of the multilayer material the covering material is caused to become largely worn away and smeared into the surface pores so to at least partially fill the surface pores and define islands of the soft covering layer material in the surface of the relatively harder bearing metal matrix, the covering layer material comprising PbSnCu and SnSbCu.

* * * * *